United States Patent
Alles et al.

(10) Patent No.: US 7,404,253 B2
(45) Date of Patent: Jul. 29, 2008

(54) PROCESS FOR MANUFACTURING A CATALYTIC CONVERTER AND PLANT THEREFOR

(75) Inventors: Markus Alles, Spiesen (DE); Bernd Müller, Scheeneck (FR)

(73) Assignee: J. Eberspächer GmbH & Co. KG, Esslingen (DE)

( * ) Notice: Subject to any disclaimer, the term of this patent is extended or adjusted under 35 U.S.C. 154(b) by 399 days.

(21) Appl. No.: 10/833,237

(22) Filed: Apr. 27, 2004

(65) Prior Publication Data
US 2004/0255459 A1   Dec. 23, 2004

(30) Foreign Application Priority Data
Jun. 20, 2003   (DE) ................ 103 27 668

(51) Int. Cl.
*B21D 51/16*   (2006.01)
(52) U.S. Cl. ................. 29/890; 29/240; 29/820
(58) Field of Classification Search ........... 29/890, 29/240, 820, 728, 890.08; 53/204, 218, 203; 72/66, 91; 131/58; 270/32; 492/51; 118/33, 118/233; 156/443, 468, 483, 475, 481, 486, 156/477.7; 229/87.02; 242/361, 528, 532.3
See application file for complete search history.

(56) References Cited

U.S. PATENT DOCUMENTS 2,135,208 A * 11/1938 Bray et al. .............. 264/279
5,862,590 A * 1/1999 Sakashita et al. .......... 29/890
6,242,071 B1   6/2001 Yamada et al.

FOREIGN PATENT DOCUMENTS

| EP | 0810353 A1 | 12/1997 |
| EP | 0947673 A2 | 10/1999 |
| EP | 1336732 A1 | 8/2003 |
| FR | 2845728 A1 | 4/2004 |
| JP | 11280459 | 10/1999 |
| JP | 2001303944 | 10/2001 |
| WO | WO0242617 A1 | 5/2002 |

* cited by examiner

*Primary Examiner*—David P. Bryant
*Assistant Examiner*—Christopher M Koehler
(74) *Attorney, Agent, or Firm*—McGlew & Tuttle, P.C.

(57) ABSTRACT

A process is provided for manufacturing a catalytic converter formed from at least one monolith being held in a catalytic converter housing, especially a motor vehicle catalytic converter. A mounting mat (14) is placed on the outer circumferential surface (38) of the monolith (12) in the process, and the monolith (12) is subsequently stuffed together with the mounting mat (14) into the catalytic converter housing. To apply the mounting mat (14) on the monolith (12), the monolith (12) is set into rotation, while the mounting mat (14) is being fed tangentially and is carried by the monolith (12). A plant for carrying out the process is also provided as well as an application device (10).

18 Claims, 3 Drawing Sheets

PROCESS FOR MANUFACTURING A CATALYTIC CONVERTER AND PLANT THEREFOR

CROSS REFERENCE TO RELATED APPLICATIONS

This application claims the benefit of priority under 35 U.S.C. § 119 of German patent application DE 103 27 668.8 filed Jun. 20, 2003 the entire contents of which are incorporated herein by reference.

FIELD OF THE INVENTION

The present invention pertains to a process for manufacturing a catalytic converter formed by at least one monolith being held in a catalytic converter housing, especially a motor vehicle catalytic converter, wherein a mounting mat is placed on the outer circumferential surface of the monolith and the monolith is subsequently stuffed together with the mounting mat into the catalytic converter housing. Furthermore, the present invention pertains to a plant for manufacturing a catalytic converter formed from at least one monolith being held in a catalytic converter housing.

BACKGROUND OF THE INVENTION

A process of the type mentioned in the introduction for manufacturing catalytic converters, especially for manufacturing motor vehicle catalytic converters, is generally known. A catalytic converter housing, which may have a great variety of cross-sectional shapes corresponding to the particular intended use, e.g., a round, oval or elliptical shape, is first manufactured according to the prior-art process by forming and welding. At least one monolith, which is manufactured from a porous ceramic material, is coated with catalyst material, and whose cross section is adapted to the cross-sectional shape of the catalytic converter housing, is stuffed into the catalytic converter housing during the subsequent operation, the so-called canning. Depending on the particular application, two or more monoliths may also be stuffed into the catalytic converter housing, and, if necessary, they are arranged at spaced locations from one another in the catalytic converter housing. The catalytic converter housing is closed after the canning, e.g., by fastening corresponding connection flanges and covers.

Due to the ceramic material used, the monolith is relatively susceptible to shocks. Any movement of the monolith in relation to the catalytic converter housing must therefore be prevented from occurring to the extent possible in order to prevent the monolith from being damaged. The monolith should also not be set to vibrate due to vibrations of the catalytic converter housing, which are transmitted, e.g., from the motor vehicle to the catalytic converter housing, or by pulsating exhaust gas flows which flow through the monolith.

To guarantee this, a mounting mat made of glass fibers, rock wool or a similar heat resistant and shock-absorbing material is usually fastened around the outer circumferential surface of the monolith, i.e., the surface that extends rotationally symmetrically to the body axis of the monolith, along which the monolith is stuffed into the catalytic converter housing. The mounting mat assumes essentially two functions. On the one hand, the mounting mat shall keep the monolith under pretension in the catalytic converter housing in order to prevent a relative movement between the monolith and the catalytic converter housing. On the other hand, the mounting mat shall effectively absorb vibrations acting on the catalytic converter housing in relation to the monolith.

To fasten the mounting mat to the monolith, the monolith is usually wrapped up manually in the mounting mat and fixed by means of an adhesive to the monolith. However, the drawback of this procedure is that the quality of the positioning of the mounting mat at the monolith is greatly affected by the individual skill and the individual performance capacity of the worker who fastens the mounting mat to the monolith.

Thus, folds, which make it difficult or even impossible to stuff the monolith provided with the mounting mat into the catalytic converter housing, may be formed during the wrapping up of the monolith in the mounting mat, or a gap may be left at the two mutually abutting lateral edges of the mounting mat during the assembly of the mounting mat, and this gap will form a bypass with the monolith stuffed into the catalytic converter housing, along which exhaust gas can flow untreated through the catalytic converter housing in parallel to the monolith. Furthermore, permanent fastening of the mounting mat with a hot-melt adhesive is not always guaranteed, so that the mounting mat may separate, especially during the canning, and the manufacturing process is interrupted. Since experience has shown that the time necessary for the assembly varies greatly in such an assembly step—it depends on the skill of the particular worker—integration of the winding in an automatic manufacturing cycle is possible with a corresponding intermediate buffer only. Despite the intermediate buffer, canning may be interrupted in case of an excessively long assembly time by the preceding wrapping up of the monolith in the mounting mat, which is performed manually, i.e., the canning machines are briefly out of use. Due to the large lot sizes in which catalytic converters are usually manufactured, this leads to high additional costs.

Segmented folding tools, which are to automatically wrap up the monolith in the mounting mat, have therefore also been used for some time. The folding tool has for this purpose a plurality of arc-shaped folding segments, which are articulated to one another and are activated one after another and lay the mounting mat section by section around the monolith. The drawback of such folding tools is, on the one hand, that the individual folding segments of the folding tool are to be actuated individually, which requires a considerable effort for control, and the folding tool consequently has to be complicated. On the other hand, the mounting mat is often creased at the transition between two folding segments, which may lead to damage to the structure of the mounting mat, which may lead as a consequence to the formation of the above-mentioned bypasses.

SUMMARY OF THE INVENTION

The object of the present invention is to provide a process and a plant for manufacturing a catalytic converter, which is formed by at least one monolith being held in a catalytic converter housing and in which or by the use of which the mounting mat can be arranged gently and uniformly on the outer circumferential surface of the monolith.

According to the invention, a process is provided for manufacturing a catalytic converter formed by at least one monolith being held in a catalytic converter housing, especially a motor vehicle catalytic converter. A mounting mat is placed on the outer circumferential surface of the monolith and the monolith is subsequently stuffed together with the mounting mat into the catalytic converter housing. To place the mounting mat on the circumferential surface, the monolith is set into rotation, while the mounting mat is being fed tangentially and is carried by the monolith.

According to another aspect of the invention, a plant is provided for manufacturing a catalytic converter formed from at least one monolith being held in a catalytic converter housing, especially for carrying out the process discussed above. The plant has a station for applying a mounting mat on the outer circumferential surface of the monolith and a stuffing station for stuffing the monolith provided with the mounting mat into the catalytic converter housing being kept ready. The station for applying the mounting mat has a winding housing, at which a feed gap is provided for feeding in the mounting mat tangentially as well as a clamping means for holding the monolith in the winding housing during the winding around with the mounting mat. The clamping means is provided with a rotary drive for rotating the monolith around its axis of rotation.

The mounting mat is fastened to the monolith according to the present invention by the mounting mat being wound around the monolith under defined boundary conditions. The monolith is rotated for this purpose around its body axis, while the mounting mat is being fed tangentially to the rotating outer circumferential surface of the monolith. The mounting mat is now being carried by the monolith, and the winding force, which acts on the mounting mat during the winding around the monolith, can be set very specifically depending on the torque with which the monolith is being rotated, on the one hand, and the force with which the mounting mat is being fed, on the other hand. This makes it possible to wind the mounting mat on the monolith very gently, and folding is prevented at the same time from occurring, because a defined, uniform tensile stress acting over the cross section of the mounting mat extending at right angles to the direction of feed acts on the mounting mat due to the feed motion of the mounting mat and the torque acting on the monolith.

Since the mounting mat has a limited elasticity when viewed over its feed length, it is, furthermore, possible to slightly vary the feed length of the mounting mat by specifically coordinating the speed of rotation of the monolith and the velocity of feed with one another such that the mounting mat can always be wound exactly on the monolith without a fold being formed, and longitudinal edges of the mounting mat that extend at right angles to the direction of winding will be properly in contact with one another after the mounting mat has been wound up on the monolith. The formation of the above-described bypasses in the monoliths stuffed into the catalytic converter housing can thus be prevented in a very specific manner. Furthermore, the lateral edges that are in contact with one another can be additionally interlocked with one another by a tongue-and-groove connection. Furthermore, a common mounting mat can also be wound around two or more monoliths with the process according to the present invention.

Thus, it is proposed in an especially preferred variant of the process according to the present invention that the speed of rotation of the monolith and the velocity of feed of the mounting mat be coordinated with one another such that the mounting mat will be wound on the monolith with a uniform pretension when viewed in the direction of feed, as a result of which it is achieved that the mounting mat will be in contact with the outer circumferential surface of the monolith extremely uniformly.

It is proposed, furthermore, for winding the mounting mat on the monolith that the monolith be introduced into a winding housing in which the monolith is set into rotation. It is achieved by using the winding housing that the mounting mat being fed tangentially is held in a defined position in relation to the monolith during the entire winding operation.

It is, furthermore, advantageous in this process variant for the mounting mat to be fed tangentially through a gap that is formed at the winding housing and extends in parallel to the axis of rotation of the monolith. It is ensured as a result that the mounting mat is fed to the monolith in a defined position already during the initial phase, and the monolith is thus able to take up the mounting mat properly.

Furthermore, it is proposed in the process variant in which the winding housing is used that the monolith be held in the winding housing such that the axis of rotation of the monolith coincides with the longitudinal axis of symmetry of the winding housing at least during the rotation such that the monolith maintains an at least approximately constant radial distance from the inner circumferential surface of the winding housing when viewed over its entire outer circumferential surface. It is achieved due to the constant distance between the monolith and the inner circumferential circumference of the winding housing that the mounting mat is pressed with a uniform pressing pressure against the outer circumferential surface of the monolith over its entire surface that is in contact with the monolith by the inner circumferential surface of the winding housing during both the introduction into the winding housing and the entire winding operation and is laid uniformly on the monolith.

The radial distance between the outer circumferential surface of the monolith and the inner circumferential surface of the winding housing is preferably selected to be such that the mounting mat is carried by the rotating monolith by friction during the tangential feed. It is thus possible to do away with additional auxiliary means with which the mounting mat is held at the monolith during the winding. As an alternative or in addition to the carrying of the mounting mat caused by friction, it is, however, also possible either to provide the monolith or the mounting mat with an adhesive at least in some sections, so that the mounting mat is carried, being bonded to the monolith during the initial phase of the winding operation and held by the bonded connection on the monolith.

In order for the mounting mat to hold the monolith with a defined press fit in the catalytic converter housing, it is proposed in a preferred variant of the process according to the present invention that the mounting mat wound on the monolith be pressed uniformly over its outer circumferential surface and that the monolith be stuffed with the pressed-on mounting mat into the catalytic converter housing. It is achieved by pressing the mounting mat that the arrangement comprising the monolith with the mounting mat wound around it will have predetermined, defined outside dimensions, which are adapted to the inside dimensions of the catalytic converter body for a sufficient press fit of the arrangement. At the same time, any unevennesses that may be preset on the mounting mat will be compensated by the pressing.

The monolith wound around with the mounting mat can be stuffed in an immediately following process step. As an alternative, e.g., when the monolith wound around with the mounting mat must first be transported from the winding station to another work station, it is advantageous to secure the mounting mat on the monolith after the winding around. For securing, the mounting mat is preferably held by rings made of a heat resistant material, into which the monolith wound around with the mounting mat is pushed. As an alternative, the mounting mat may also be secured on the monolith by a heat resistant adhesive.

To guarantee a defined seating of the monolith wound around with the mounting mat in the catalytic converter housing, it is proposed, furthermore, to expand the catalytic converter housing radially at least in some sections in a defined manner before the monolith is stuffed in. The catalytic converter housing is expanded now to the extent that the inside dimensions of the catalytic converter housing are adapted to the outside dimensions of the arrangement formed by the monolith wound around with the mounting mat to form a press fit, optionally after pressing the mounting mat. The particular monolith is preferably measured before the mounting mat is wound around it, and the catalytic converter housing is expanded individually corresponding to the determined outside dimensions of the monolith.

According to another aspect, the present invention pertains to a plant for manufacturing a catalytic converter formed from at least one monolith being held in a catalytic converter housing, which is especially suitable for carrying out the above-described process according to the present invention. The plant according to the present invention has a station for winding the mounting mat around the monolith as well as a stuffing station for stuffing the monolith provided with the mounting mat into a catalytic converter housing kept ready. The station for winding around the monolith has a winding housing, at which a feed gap for tangentially feeding the mounting mat is provided, as well as a clamping means for holding the monolith in the winding housing during the winding around with the mounting mat, wherein the clamping means is provided with a rotary drive for rotating the monolith around its longitudinal axis.

In a preferred embodiment of the plant according to the present invention, the clamping means has a stamp each on both sides of the winding housing, of which at least one of the two stamps is axially displaceable in relation to the other stamp to clamp the monolith between the stamps and one of the two stamps is to be driven rotatably around the axis of displacement. Furthermore, the winding housing is open at both of its ends, so that the clamping means can be moved into the winding housing and can be removed from the winding housing. The advantage of this embodiment is especially that both the clamping and the rotation of the monolith for being wound around by the mounting mat can be carried out automatically.

Furthermore, it is proposed that the station be equipped with a feed means adjoining the feed gap of the winding housing for feeding the mounting mat into the winding housing. It is possible by means of the feed means to feed the mounting mat at a defined, preferably variable rate of feed tangentially in relation to the speed of rotation of the monolith, so that a defined tension can be set in the direction of feed due to the mutual coordination of the speed of rotation of the monolith and the velocity of feed of the mounting mat.

To further increase the degree of automation of the plant, it is proposed, furthermore, in the above-described embodiment of the plant according to the present invention that a handling means for separating the mounting mat from a mounting mat stack and for delivering the mounting mat into the feed means be provided adjacent to the feed means.

The plant or device according to the present invention may be integrated within a cyclically operating overall plant in which the plants or devices are linked by corresponding handling means for the manufacture of large lots of catalytic converters, in which, e.g., a welding station is provided for the catalytic converter housing in parallel to the station for winding around the monolith, and the stuffing station is arranged directly downstream of the station for winding around the monolith. However, it is also conceivable as an alternative that the individual work stations, for example, the station for winding around the monolith and the stuffing station, are designed as mutually separate stations. It is particularly advantageous in such an application to provide a securing station for securing the mounting mat at the monolith between the station for winding around the monolith and the stuffing station, which said securing station is preferably used for holding rings, into which the monolith wound around with the mounting mat is to be introduced for securing. It is guaranteed by securing the mounting mat that the mounting mat previously wound around the monolith will not separate or change its position at the monolith when the monolith with the mounting mat is being transported to the stuffing station.

To ensure that the arrangement comprising the monolith with the mounting mat wound around it have defined outside dimensions, it is, furthermore, advantageous for a pressing means to be provided at the stuffing station for pressing the mounting mat being held at the monolith on the outer circumferential surface, with which such pressing station the mounting mat can be pressed gently to desired outside dimensions before being stuffed into the catalytic converter housing.

Other features and advantages of the present invention will appear from the following description of a preferred exemplary embodiment with reference to the attached drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
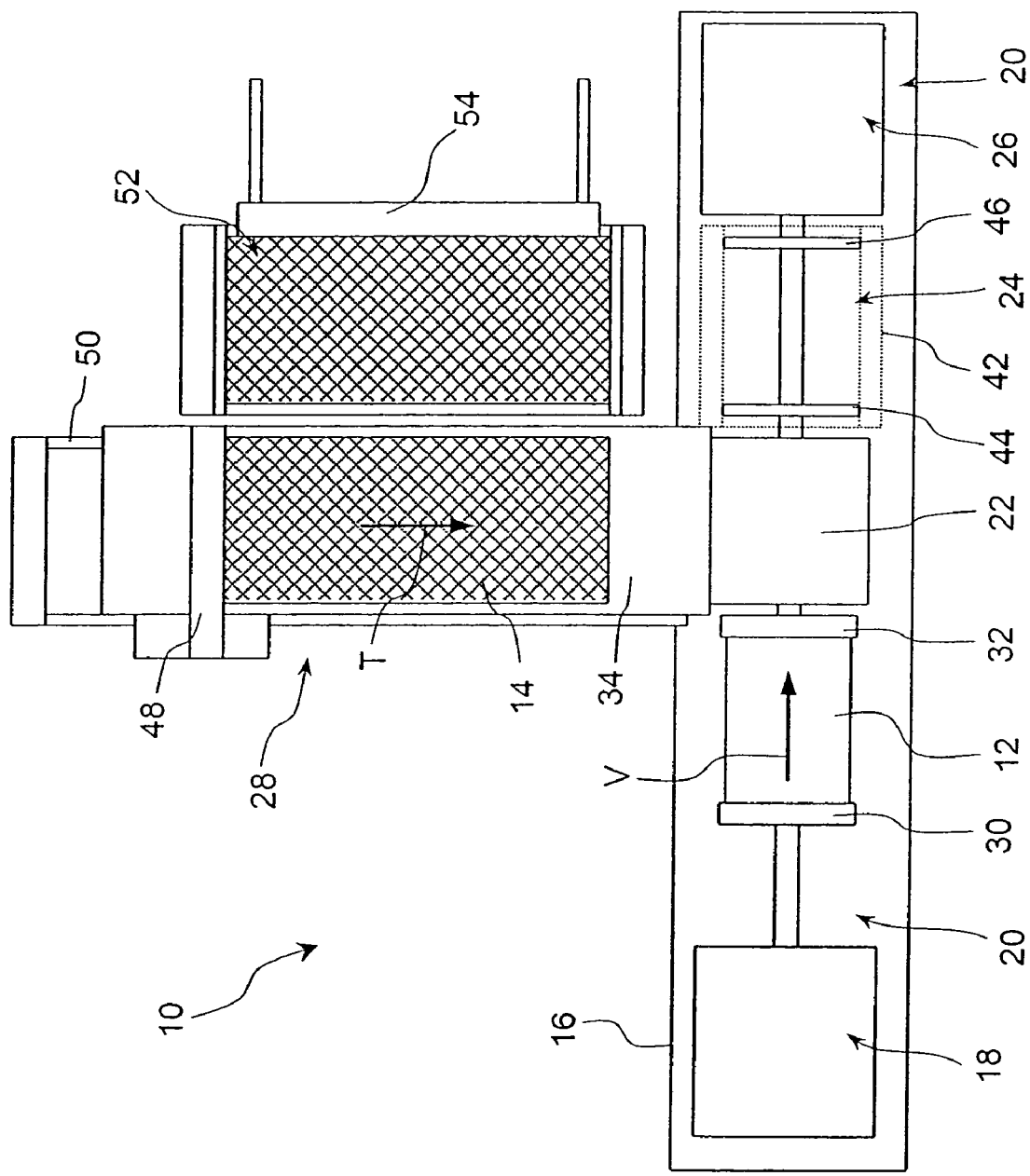
FIG. 1 is a schematic top view of a winding station for winding a mounting mat around a monolith, which winding station is used in a plant for manufacturing a catalytic converter.

FIG. 1 shows a schematic top view of a winding station 10 for winding a mounting mat 14 made of glass fibers around a monolith 12.

The winding station 10 has a frame 16, on which a first clamping unit 18 of a clamping means 20, shown in the left-hand part of FIG. 1, a winding housing 22, a securing means 24 as well as a second clamping unit 26 of the clamping means 20 are fastened. The clamping means 20 formed from the two clamping units 18 and 26 is used to hold, rotate and transport the monolith 12 through the station 10, as will be explained in detail below.

A feed means 28 for tangentially feeding the mounting mat 14 is provided adjacent to the winding housing 22. Furthermore, a handling means, not shown for the sake of clarity, is provided, with which the monolith 12 is inserted into and removed from the station 10.

Both the clamping means 18 and the clamping unit 26 of the clamping means 20 are equipped with a respective stamp 30 and 32 each. The stamps 30 and 32 can be displaced to and fro axially in the longitudinal direction of the frame 16 along a common axis of displacement V. The axis of displacement V of the stamps 30 and 32 coincides here with the axis of symmetry of the winding housing 22, which has an at least approximately round cross section, such that the monolith 12 to be held between the stamps 30 and 32 can be displaced from a receiving position, adjacent to the winding housing 22, into a winding position in the winding housing 22 and from there into a securing position in the securing means 26, from which the handling means will finally remove the monolith 12 wound around with the mounting mat 14 from the station 10. Furthermore, at least one of the two stamps 30 and 32 is provided with a rotary drive, with which the approximately cylindrical monolith 12 being clamped between the stamps 30 and 32 is to be rotated around its axis of symmetry, wherein the other rotatably mounted stamp 32 or 30 is being carried. Both stamps 30 and 32 are driven synchronously with one another in one variant of the clamping means 20.

Figure 2:
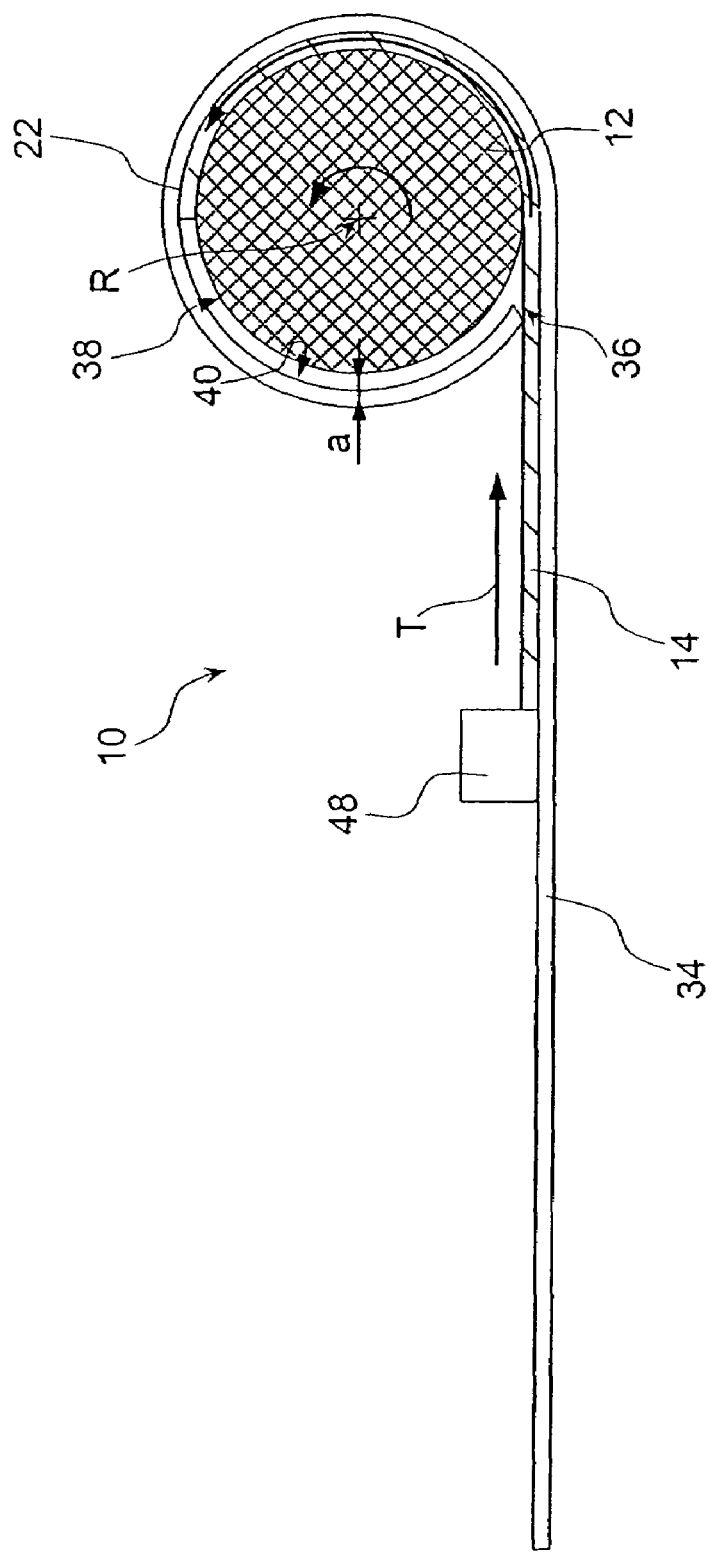
FIG. 2 is a schematic front view of the winding housing used in the plant according to FIG. 1.
Figure 3:
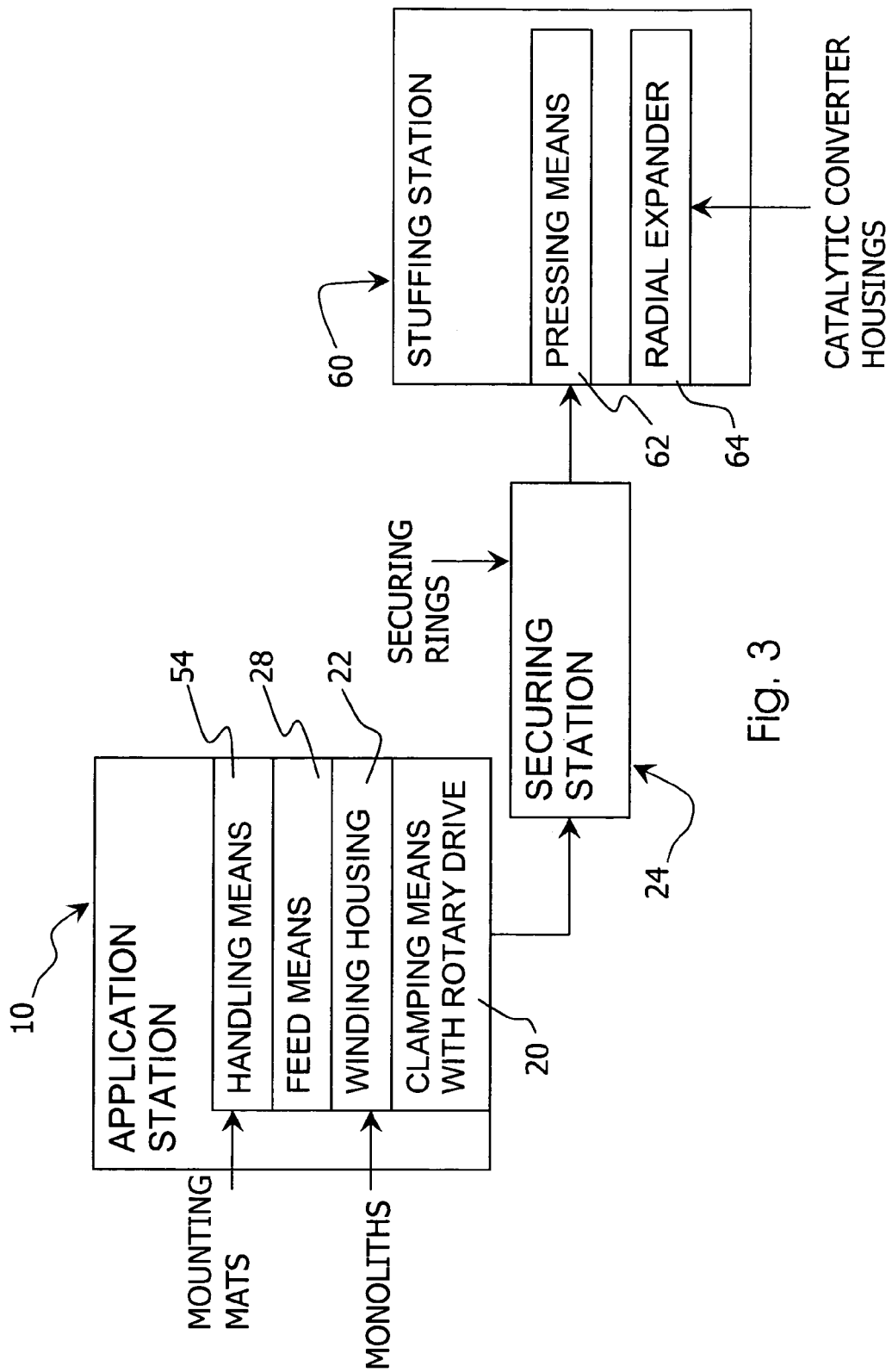
FIG. 3 is a schematic diagram showing the plant.

As is shown in FIG. 2, which shows a front view of the winding housing 22, the winding housing 22 passes over on its side shown in the left-hand part of FIG. 2 into an approximately horizontally extending support 34 for the feed means 28. A feed gap 36, which extends in parallel to the longitudinal direction of the winding housing 22 and is used to feed the mounting mat 14 into the winding housing 22, is provided at the transition of the winding housing 22 into the support 34. FIG. 2 also shows that the stamps 30 and 32 of the clamping means 20 hold and rotate the monolith 12 in relation to the winding housing 22 such that the axis of rotation R of the monolith 12 coincides with the axis of symmetry of the winding housing 22. As a result, the monolith 12 with its outer circumferential surface 38 is maintained at an approximately constant distance a from the inner circumferential surface 40 of the winding housing 22.

The securing means 24 has a housing 42 (drawn in broken lines), whose cross section is adapted to the cross section of the winding housing 22 and comprises two parts, so that the housing 42 can be opened. Two grooves 44 and 46, which extend at right angles of the axis of displacement V and are used to receive a ring made of a heat resistant material each, are provided at the housing 42. The internal diameter of the two rings acting as securing elements is adapted to the external diameter of the monolith 12 wound around with the mounting mat 14. To secure the mounting mat 14 on the monolith 12, the monolith 12 wound around with the mounting mat 14 is introduced by the stamps 30 and 32 into the rings, which are being held in the housing 42 of the securing means 24, likewise extend at right angles to the axis of displacement V and hold the mounting mat 14 at the monolith 12 after the opening of the housing 42.

The feed means 28 has a pusher 48, which is movable to and for in a direction of feed T in the longitudinal direction of the support 34 and is guided at a pair of guides 50 provided on the underside of the support 34. Furthermore, a stacking means 52, in which a larger number of mounting mats 14 are kept ready stacked up for the winding operation, is provided to the side of the support 34. A separator 54, with which the lowermost mounting mat 14 in the stacking means 52 is delivered onto the support 34, is provided at the stacking means 52.

At the beginning of the winding operation the station 10 is moved into its starting position, in which the two stamps 30 and 32 have been moved into the receiving position shown in the left-hand part of FIG. 1. The stamps 30 and 32 are now moved apart to the extent that the handling means, not shown, can position the monolith 12 to be wound around between the stamps 30 and 32 without problems. Furthermore, the separator 54 delivers a single mounting mat 14 onto the support 34. The pusher 48 is then displaced to the extent that the front edge of the mounting mat 14 is arranged directly adjacent to the feed gap 36.

After the station 10 has been moved into its starting position, the handling means, not shown, positions the monolith 12 between the stamps 30 and 32, which are subsequently moved toward each other and clamp it between them. The clamped monolith 12 is then moved by the two stamps 30 and 32 into the winding position in the winding housing 22. As soon as the monolith 12 is in the winding position, the pusher 48 is activated, and it introduces the mounting mat 14 in the direction of feed T into the winding housing 22, and the monolith 12 is rotated by the clamping units 18 and 24 around the axis of rotation R. As soon as it has been introduced through the feed gap 36 into the area between the outer surface 38 of the monolith 12 and the inner surface 40 of the winding housing, the mounting mat 14 is then carried because of the relatively high roughness of the outer surface 38 of the monolith 12, while it is sliding along the inner surface 40 of the winding housing 22. The speed of rotation of the monolith 12 around the axis of rotation R and the velocity of feed of the mounting mat 14 in the direction of feed T are coordinated with one another such that the mounting mat 14 lies on the moving outer circumferential surface 38 of the monolith 12. The pusher 48 is continuously feeding the mounting mat 14 in the process, and the tensile stress that acts on the mounting mat 14 in its longitudinal direction extending in the direction of feed T can be varied to a limited extent by changing the velocity of feed with which the mounting mat 14 is being introduced into the winding housing 22 by the pusher 48.

As soon as the mounting mat 14 has been pulled completely into the winding housing 22, the speed of rotation of the monolith 12 is slowed down, and the mounting mat 14 being held on the monolith 12 is turned into a position in which the mounting mat 14 with its lateral edges extending in parallel to the axis of rotation R meet or abut against each other.

After the mounting mat 14 has been properly wound on the monolith 12, the clamping means 18 and 24 are stopped and moved in the direction of the securing means 26. The stamps 30 and 32 deliver the monolith 12 wound around with the mounting mat 14 into the closed housing 42 of the securing means 26. With the housing open 42, rings, which are to be used to secure the mounting mat 14 in its position in relation to the monolith 12, had been previously placed into the grooves 44 and 46. For securing, the monolith 12 wound around with the mounting mat 14 is guided by the rings being held in the housing 42 in the grooves 44 and 46, and the mounting mat 14 cannot separate from the monolith 12 during the stuffing into the housing 42, because the size and the shape of the cross section of the closed housing 42 of the securing means 26 are at least approximately the same as those of the monolith 12, as was explained before. As soon as the monolith 12 wound around with the mounting mat 14 has been completely stuffed into the housing 42, i.e., it is in its secured position, the divided housing 42 of the securing means 26 is opened, and the handling device removes the completely wound monolith 12 with its mounting mat 14 being secured by the rings from the securing means 26. The station 10 is then moved again into its starting position.

The monolith 12 thus wound around with the mounting mat 14 is subsequently fed to the pressing means 62 of a stuffing station 60, in which the mounting mat 14 being held on the monolith 12 is pressed together to a predetermined size. Along with the mounting mat 14, the monolith 12, thus pretreated and pressed, is then stuffed into the catalytic converter housing being kept ready. The catalytic converter housing may be pretreated, before the stuffing by a radial expander 64, wherein the catalytic converter housing is radially expanded in at least some sections before the monolith is stuffed in.

The station 10 is designed in the above-described exemplary embodiment as an independent process station, which is not directly integrated within a production line. However, it is also conceivable to integrate the station 10 within the process of a production line. The securing means 26 may be eliminated in this case, and the monolith 12, wound completely around with a mounting mat 14, is delivered directly into the pressing means 62 of the stuffing station 60 without securing.

Furthermore, it is conceivable to design the winding housing 22 as a divided housing in order to wind a common mounting mat 14 around a plurality of monoliths 12 in the winding housing 22.

While specific embodiments of the invention have been shown and described in detail to illustrate the application of the principles of the invention, it will be understood that the invention may be embodied otherwise without departing from such principles.

What is claimed is:

1. A process for manufacturing a catalytic converter formed with at least one monolith being held in a catalytic converter housing for a vehicle catalytic converter, the process comprising:
   placing a portion of a mounting mat on the outer circumferential surface of the monolith;
   setting the monolith into rotation, while the mounting mat is being fed tangentially and is carried by the monolith, wherein to apply the mounting mat, the monolith is introduced into a winding housing, in which the monolith is set into rotation;
   subsequently stuffing the monolith together with the mounting mat into the catalytic converter housing.

2. A process in accordance with claim 1, wherein the speed of rotation of the monolith and the velocity of feed of the mounting mat are coordinated with one another such that the mounting mat is wound on the monolith with a substantially uniform tensile stress when viewed in the direction of feed.

3. A process in accordance with claim 1, wherein the mounting mat is fed in tangentially through a gap, which extends in parallel to the axis of symmetry and is provided at the winding housing.

4. A process in accordance with claim 1, wherein the axis of rotation of the monolith coincides with the longitudinal axis of symmetry of the winding housing at least during the rotation of the monolith such that the monolith maintains an at least approximately constant distance from the inner circumferential surface of the winding housing when viewed over the entire outer circumferential surface of the monolith.

5. A process in accordance with claim 4, wherein the radial distance between the outer circumferential surface of the monolith and the inner circumferential surface of the winding housing is selected to be such that the mounting mat is carried by the rotating monolith by friction during the tangential feed.

6. A process in accordance with claim 1, wherein the mounting mat wound on the monolith is pressed uniformly over its outer circumferential surface, and the monolith with the pressed mounting mat is stuffed into the catalytic converter housing.

7. A process in accordance with claim 1, wherein the mounting mat is secured by rings after having been wound around the monolith.

8. A process in accordance with claim 1, wherein the catalytic converter housing is radially expanded in at least some sections before the monolith is stuffed in.

9. A process in accordance with claim 1, wherein the step of setting the monolith into rotation includes rotating the monolith about a monolith axis of rotation that is fixed whereby the feeding of the mounting mat is in a direction tangential to an outer monolith surface rotating about said fixed axis to carry the mounting mat by the monolith relative to said fixed axis.

10. A process for manufacturing a catalytic converter, the process comprising the steps of:
    providing a cylindrical monolith with an outer circumferential surface;
    rotating the monolith about an axis of rotation;
    during the step of rotating, feeding the mounting mat tangentially to the outer circumferential surface to place a portion of a mounting mat in contact with the outer circumferential surface of the monolith such that the mounting mat is carried by the rotating monolith and the mounting mat is wrapped around the circumferential surface, wherein to wrap the mounting mat, the monolith is introduced into a winding housing for the step of rotating the monolith wherein the axis of rotation is in a fixed position; and
    subsequent to the mounting mat being wrapped around the circumferential surface, stuffing the monolith together with the mounting mat into the catalytic converter housing.

11. A process in accordance with claim 10, wherein the speed of rotation of the monolith and the velocity of feed of the mounting mat are coordinated with one another such that the mounting mat is wound on the monolith with a substantially uniform tensile stress when viewed in the direction of feed.

12. A process in accordance with claim 10, wherein the mounting mat is fed in tangentially through a gap, which extends in parallel to the axis of symmetry and is provided at the winding housing.

13. A process in accordance with claim 12, wherein the axis of rotation of the monolith coincides with the longitudinal axis of symmetry of the winding housing at least during the rotation of the monolith such that the monolith maintains an at least approximately constant distance from the inner circumferential surface of the winding housing when viewed over the entire outer circumferential surface of the monolith.

14. A process in accordance with claim 13, wherein the radial distance between the outer circumferential surface of the monolith and the inner circumferential surface of the winding housing is selected to be such that the mounting mat is carried by the rotating monolith by friction during the tangential feed.

15. A process in accordance with claim 11, wherein:
    during the step of rotating the monolith the mounting mat wound on the monolith is pressed uniformly over its outer circumferential surface.

16. A process in accordance with claim 15, wherein the mounting mat is secured by rings after having been wound around the monolith.

17. A process in accordance with claim 15, wherein the catalytic converter housing is radially expanded in at least some sections before the monolith is stuffed in.

18. A process for manufacturing a catalytic converter, the process comprising the steps of:
    providing a winding housing with an inner surface;
    providing a cylindrical monolith with an outer circumferential surface;
    providing clamping units for holding the cylindrical monolith;
    engaging ends of the monolith with the clamping units and rotating the monolith about an axis of rotation in a fixed position within the winding housing;
    feeding the mounting mat into the winding housing between the inner surface and the outer circumferential surface and tangentially to the circumferential surface to place a portion of a mounting mat in contact with the outer circumferential surface of the monolith such that the mounting mat is carried by the rotating monolith and moves relative to the inner surface and the mounting mat is wrapped around the circumferential surface;

coordinating the speed of rotation of the monolith and the velocity of feed of the mounting mat; and subsequent to the mounting mat being wrapped around the circumferential surface, stuffing the monolith together with the mounting mat into the catalytic converter housing.

* * * * *